United States Patent
Huffman et al.

[11] Patent Number: 5,580,839
[45] Date of Patent: Dec. 3, 1996

[54] BINARY FERRIHYDRITE CATALYSTS

[75] Inventors: Gerald P. Huffman; Jianmin Zhao; Zhen Feng, all of Lexington, Ky.

[73] Assignee: University of Kentucky Research Foundation, Lexington, Ky.

[21] Appl. No.: 315,456

[22] Filed: Sep. 30, 1994

[51] Int. Cl.$^6$ .................................................. B01J 23/745
[52] U.S. Cl. ........................ 502/338; 502/202; 502/213; 502/258; 502/313; 502/316
[58] Field of Search .................................. 502/338, 316, 502/313, 258, 213, 202

[56] References Cited

U.S. PATENT DOCUMENTS

| | | | |
|---|---|---|---|
| 3,716,497 | 2/1973 | Courty | 502/316 |
| 3,843,745 | 10/1974 | Christman et al. | 502/316 |
| 3,896,049 | 7/1975 | Dworak . | |
| 4,096,096 | 6/1978 | Nishikawa et al. . | |
| 5,214,015 | 5/1993 | Farcasiu et al. | 502/222 |

FOREIGN PATENT DOCUMENTS 1-027644 7/1987 Japan .................................. 502/338

OTHER PUBLICATIONS

Zhao, Jianmin, et al.; Binary Iron Oxide Cataysts for Direct Coal Liquefaction; Energy & Fuels; v. 8, 1; 38–43; 1994.
Zhao, Jianmin, et al.; Organic acid Treatment of Ferrihydrite Catalysts for Improved Coal Liquefaction; Energy & Fuels; v. 8, 5; 1152–1153; 1994.
Quin, Thomas G., et al.; Influence of Silicon and Phosphorus on Structural and Magnetic Properties of Synthetic Goethite and Related Oxides; Clay & Min. Soc.; v. 36, 2; 165–75;1988.
Pradhan, Vivek R., et al; Finedly Dispersed Iron, Iron–Moly–Bdenum, & Sulfated Iron Oxides as Catalysts for Coprocessing Reactions; Energy & fuels; v. 5, 5; 712–20; 1991.
Schwertmann, U., et al.; The Influence of [Fe(II)], [Si], & pH on the Formation of Lepidocrocite & Ferrihydrite During Oxidation of Aqueous $FeCl_2$ Solutions; Mar. 1976.

Primary Examiner—Asok Pal
Assistant Examiner—Bekir L. Yildirim
Attorney, Agent, or Firm—King and Schickli

[57] ABSTRACT

A method of preparing a catalyst precursor comprises dissolving an iron salt and a salt of an oxoanion forming agent, in water so that a solution of the iron salt and oxoanion forming agent salt has a ratio of oxoanion/Fe of between 0.0001:1 to 0.5:1. Next is increasing the pH of the solution to 10 by adding a strong base followed by collecting of precipitate having a binary ferrihydrite structure. A binary ferrihydrite catalyst precursor is also prepared by dissolving an iron salt in water. The solution is brought to a pH of substantially 10 to obtain ferrihydrite precipitate. The precipitate is then filtered and washed with distilled water and subsequently admixed with a hydroxy carboxylic acid solution. The admixture is mixed/agitated and the binary ferrihydrite precipitate is then filtered and recovered.

16 Claims, 1 Drawing Sheet

Iron ion in the interior

Iron ion in the interior

Iron ion at the surface

BINARY FERRIHYDRITE CATALYSTS

This invention was made with government support under contract number DE-FC22-90PC90029 awarded by the Department of Energy. The government has certain rights in the invention.

TECHNICAL FIELD

The present invention relates generally to the field of catalysis and more particularly, to a method of producing highly dispersed iron oxide catalyst precursors useful for direct coal liquefaction and those catalyst precursors and catalysts produced therefrom useful for direct coal liquefaction.

BACKGROUND OF THE INVENTION

Coal liquefaction is the process of converting various ranks of coal, including lignite, subbituminous, and bituminous, to petroleum-like hydrocarbon liquids. These liquids contain less sulfur, nitrogen, and ash than the solid starting material and are also easier to transport and utilize. Advantageously, the resulting hydrocarbon liquids are suitable for utilization as refinery feed stocks for the manufacture of, for example, gasoline; jet, diesel and turbine fuels; heating and fuel oils; and other petro-chemical products that may be utilized to meet commercial, residential and industrial fuel requirements.

The coal liquefaction process involves depolymerizing the coal and increasing the ratio of hydrogen to carbon atoms by a factor of from about two to three times that in the starting coal materials. In direct coal liquefaction (DCL), the hydrogen is chemically added to the coal molecules under conditions of high pressure and temperature.

More specifically, in DCL, the coal is first crushed and slurried. Preferably, the slurry is made utilizing a process-derived solvent. A catalyst is then added and/or the solvent may be hydrogenated to improve hydrogen transfer to the coal. The slurry is then heated to, for example, 400°–500° C. and pressurized under hydrogen to a pressure of 140–300 atm. As the coal is heated to the desired reaction temperature and held there for the necessary residence time, chemical bonds are broken and free-radical fragments are generated. These free-radical fragments may then participate in various secondary reactions by, for example, reacting further to form lighter liquids, polymerizing to form high-molecular weight compounds or combining with hydrogen to produce stable liquids. By controlling these secondary reactions it is possible to achieve high conversion rates and good selectivity to produce desired, distillable liquid products.

The same basic procedures may be used to liquify other hydrocarbon-based solids such as waste plastics and rubber tires and to coliquefy mixtures of coal with such waste materials. The catalysts described in this patent can also be used for these processes. For the sake of simplicity, the liquefaction process for all such materials will be generally referred to as "direct coal liquefaction" or DCL.

An important factor in the conversion efficiency and yield of any DCL process is the material utilized to catalyze the process. In order to improve processing efficiency a variety of novel techniques have been utilized in the past to produce highly dispersed iron oxide catalyst precursors. These iron oxide catalyst precursors are often reacted with sulfur during liquefaction to provide a catalyst for DCL processing. Under the high pressure and temperature conditions of the DCL process, many iron oxide catalysts undergo phase transformations to $Fe_{1-x}S$. A good DCL iron oxide catalyst precursor must be able to maintain its dispersion and transform to a highly dispersed $Fe_{1-x}S$ phase under DCL reaction condition.

SUMMARY OF THE INVENTION

Accordingly, two primary objectives of the present invention are to provide a new and improved DCL catalyst having the above-described advantages and a simple and efficient method for producing the same.

The present invention provides a method for producing an improved catalyst precursor having a binary ferrihydrite structure that advantageously resists agglomeration at temperatures and pressures associated with the DCL process. Accordingly, the catalyst precursor transforms to a dispersed and catalytically active $Fe_{1-x}S$ phase so as to allow more efficient conversion and increased yields of desired liquid products.

Yet another object of the present invention is to provide a method of producing a catalyst precursor by means of a simple precipitation method that incorporates iron as the major cation and that includes a secondary agent which contains an element from the group consisting of tin, aluminum, silicon, molybdenum, phosphorous, boron, chromium, manganese and tungsten. Alternatively, a catalyst precursor may be prepared by admixing ferrihydrite with an hydroxy-carboxylic acid solution and collecting the precipitate. Advantageously, the resulting catalyst exhibits substantially less particle agglomeration under DCL reaction conditions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method of forming a catalyst precursor particularly adapted for utilization in DCL processes is provided. The method includes the step of dissolving an iron salt and an oxoanion forming agent in distilled water. Preferably, the iron salt includes a ferric (Fe III) cation. Iron salts that can be used include but are not limited to nitrates, sulfates, and chlorides. Most preferably, ferric nitrate $(Fe(NO_3)_3 \cdot 9H_2O)$ is utilized. The oxoanion forming agent is capable of producing oxoanions $(MO_x^-)$ when dissolved in water. These may be absorbed/chemisorbed at coordinate unsaturated sites (CUS) at the surface of the ferrihydrite precipitate to form a binary ferrihydrite. The element (M) includes silicon, molybdenum, phosphorus, boron, chromium, manganese, tungsten and any mixture thereof.

More specifically, the iron salt is dissolved in a first aqueous solution. A salt of the oxoanion forming agent is dissolved in a second aqueous solution. The first and second solutions are then admixed so that the admixed solution includes iron salt and the salt of the oxoanion forming agent at the desired atomic ratio of M/Fe and ratio of oxoanion/Fe of between 0.0001:1 and 0.5:1 and more preferably 0.01:1 to 0.1:1. Next, ammonium hydroxide is carefully added to the solution to slowly bring the pH to about 10 and thereby promote the formation of a precipitate. This precipitate may be collected by filtering. Once it is collected the precipitate is washed and filtered repeatedly with distilled water until a pH of 7 is reached. The collected precipitate is then dried whereupon it is ready for use as a catalyst precursor in DCL processes. Advantageously, when reacted with a sulfur donor such as dimethyl disulfide, the binary ferrihydrite catalyst precursor converts to a dispersed and catalytically active phase of $Fe_{1-x}S$ under DCL reaction conditions providing greater conversion efficiency and higher overall yields.

In some types of DCL or other hydrotreatment process, however, it may be desirable to leave the catalyst in an oxidized form; this can be accomplished by not adding sulfur or by adding catalyst in concentrations that exceed the sulfur level.

It should further be appreciated that anions of hydroxy-carboxylic acids may also be used as the oxoanion agents ($RO_x^-$). Such hydroxy-carboxylic acids include citric acid, meso tartaric acid, L-tartaric acid, glycolic acid, salicylic acid, DL-malic acid and mucic acid. The hydroxy-carboxylic acid is dissolved in a second aqueous solution and is added to a ferrihydrite precipitate to form a surface modified binary ferrihydrite precipitate. This is then collected for subsequent use as a catalyst precursor. The average particle size of the precipitated catalyst precursor of either method is less than 100 Å.

BRIEF DESCRIPTION OF THE DRAWING FIGURE

The accompanying drawing incorporated in and forming a part of the specification, illustrates several aspects of the present invention and together with the description serves to explain the principles of the invention. In the drawing:

FIG. 1a–c are a schematical representations of the catalyst precursor of the present invention including chemisorbed oxoanions on its surface.

DETAILED DESCRIPTION OF THE INVENTION

Figure 1B:
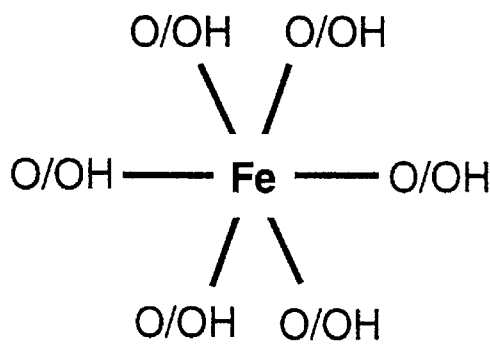

As indicated above, the present invention relates to a method of preparing a catalyst precursor of binary ferrihydrite structure. Advantageously, when reacted with a sulfur donor the catalyst precursor converts to a dispersed $Fe_{1-x}S$ phase that is catalytically active and therefore useful in DCL processing wherein various ranks of coal and/or other hydrocarbon materials such as waste plastics and rubber tires are converted to petroleum-like hydrocarbon liquids.

The method includes the step of dissolving an iron salt in a first aqueous solution. Iron is the active agent cation for the catalyst. Preferably, the iron is in its ferric (Fe III) form. Any number of ferric salts may be utilized including various anions such as nitrates, sulfates and chlorides. Preferably, $Fe_2(SO_4)_3(NH_4)_2SO_4 \cdot 24H_2O$, $Fe_2(SO_4)_3 \cdot 9H_2O$, $FeCl_3 \cdot 6H_2O$ and more preferably $Fe(NO_3)_3 \cdot 9H_2O$ are utilized and dissolved in the first aqueous solution.

A separate, second aqueous solution is then prepared by dissolving a salt of an oxoanion forming agent in distilled water. The oxoanion forming agent produces oxoanions ($MO_x^-$) in water. The element M of the oxoanion is preferably selected from a group consisting of silicon, molybdenum, phosphorous, boron, chromium, manganese, tungsten and any mixtures thereof. Next is the admixing of the first and second solutions. The concentration of the iron salt and salt of the oxoanion forming agent utilized in the first and second solutions are such as to provide an atomic ratio of M/Fe and a ratio of oxoanion/Fe between 0.0001:1 and 0.5:1 and more preferably between 0.01:1 to 0.1:1. Then, ammonium hydroxide or some other strong base is slowly added to the admixed solution (while mixing or agitating) to bring the admixed solution to a pH of about 10. This change in pH causes a binary ferrihydrite product to precipitate. It is this precipitate that is collected (e.g. by filtering and drying) and utilized as a catalyst precursor.

Preferably, the salt of the oxoanion forming agent utilized in the present method is selected from a group consisting of $Na_2SiO_3 \cdot 9H_2O$, $K_2SiO_3$, $Na_2 \cdot xSiO_2$ (where x=3–5), $K_2Si_4O_9 \cdot H_2O$, $Na_2Si_2O_5$, $K_2Si_2O_5$, $(NH_4)_6Mo_7O_{24} \cdot 4H_2O$, $3(NH_4)_2 \cdot 0.5MoO_3 \cdot 2MoO_4 \cdot 6H_2O$, $Na_2MoO_4 \cdot 2H_2O$, $K_2MoO_4$, $Na_6Mo_7O_{24} \cdot 22H_2O$, $K_2O \cdot 3MoO_4 \cdot 3H_2O$, $Na_2Mo_4O_{13} \cdot 6H_2O$, $K_2O \cdot 3MoO_3 \cdot 3H_2O$, $Na_2HPO_4$, $K_2HPO_4$, $NaH_2PO_4 \cdot 2H_2O$, $Na_2HPO_3 \cdot 5H_2O$, $NaH_2PO_3 \cdot H_2O$, $Na_4P_2O_7 \cdot 10H_2O$, $K_4P_2O_7 \cdot 3H_2O$, $NaNH_4HPO_4 \cdot 4H_2O$, $NaBO_2 \cdot 4H_2O$, $KBO_2$, $NaB_4O_7 \cdot 10H_2O$, $K_2B_4O_7 \cdot 8H_2O$, $Na_2Cr_2O_7 \cdot 2H_2O$, $K_2Cr_2O_7$, $Na_2CrO_4 \cdot 10H_2O$, $K_2CrO_4$, $(NH_4)_2Cr_2O_7$, $Na_2MnO_4 \cdot 10H_2O$, $K_2MnO_4$, $NaMnO_4$, $KMnO_4$, $(NH_4)_6H_2W_{12}O_{40}$ and any mixtures thereof.

Alternatively, a binary ferrihydrite catalyst precursor may be prepared by dissolving iron salt ($Fe^{3+}$) such as $Fe(NO_3)_3 \cdot 9H_2O$, $Fe(SO_4)_3(NH_4)_2SO_4 \cdot 24H_2O$, $Fe_2(SO_4)_3 \cdot 9H_2O$ and $FeCl_3 \cdot 6H_2O$ in water (preferably distilled water) to form an iron salt solution. Next is the adjusting of the pH of the iron salt solution to substantially 10. This may be done by slowly adding ammonium hydroxide or other strong base. As the pH slowly approaches 10, a ferrihydrite precipitate is produced. This ferrihydrite precipitate is washed with distilled water until a pH of 7 is reached. The ferrihydrite precipitate is then added to a hydroxy-carboxylic acid solution including a hydroxy-carboxylic acid selected from a group including citric, meso tartaric, L-tartaric, glycolic, salicylic, DL malic, mucic and any mixtures thereof. The solution has a molar concentration of hydroxy-carboxylic acid of between $10^{-2}$ to $10^{-5}$M. After mixing, the admixed solution is filtered to collect a binary ferrihydrite precipitate that may then be washed with distilled water and dried for subsequent use. In this approach the various hydroxy-carboxylic acids form the oxoanions ($RO_x^-$).

The catalyst precursor product of both of the above described methods is characterized by a ratio of oxoanion/Fe typically between 0.0001:1 and 0.5:1 and more preferably 0.01:1 to 0.1:1. Further, after reaction of the resulting precursor with a sulfur donor (e.g. dimethyl disulfide), an $Fe_{1-x}S$ active phase is formed. This characteristic makes the catalyst product of the present invention particularly useful for the efficient and effective processing of coal or other hydrocarbon materials by DCL.

It is well established that the performance of an iron oxide catalyst is determined mainly by its surface structure and condition. Ferrihydrite is one of the eight major iron oxide/oxyhydroxide compounds. While its specific structure is still controversial, we have found using x-ray absorption fine structure spectroscopy that the structure is oxyhydroxide-like. More significantly, at the surface the catalyst a large percentage of iron ions are at coordinate unsaturated (CUS) sites. These CUS sites play a major role in controlling particle agglomeration and phase transformation from the ferrihydrite to $\alpha$-$Fe_2O_3$ at high temperature in air.

Studies described in the examples to follow have shown that the particle agglomeration and phase transition properties of conventional ferrihydrite catalysts and the binary ferrihydrite catalyst of the present invention are both dependent upon the surface structure and the surface conditions. Being coordinate unsaturated, the CUS sites at the surface of a conventional ferrihydrite catalyst are susceptible to absorbing water molecules. The absorbed water molecules link the small ferrihydrite particles into clusters. At elevated temperatures and in air, the water molecules are evolved from the particle joints, leading to particle agglomeration and phase transition to $\alpha\text{-}Fe_2O_3$. Accordingly, under DCL conditions, a conventional ferrihydrite catalyst disadvantageously suffers from converting to a low surface area $Fe_{1-x}S$ phase when subjected to high pressure and temperature conditions characteristic of DCL processing.

Figure 1C:
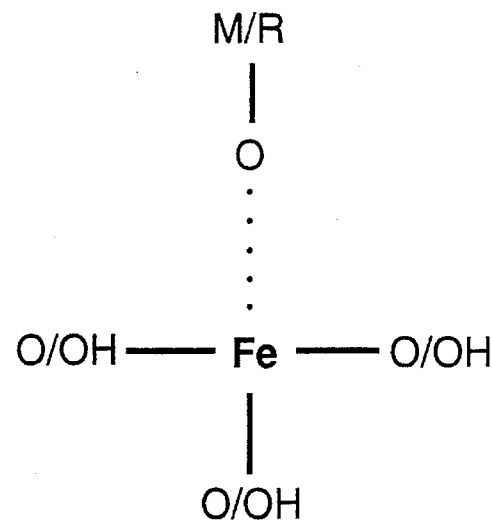
Figure 1A:
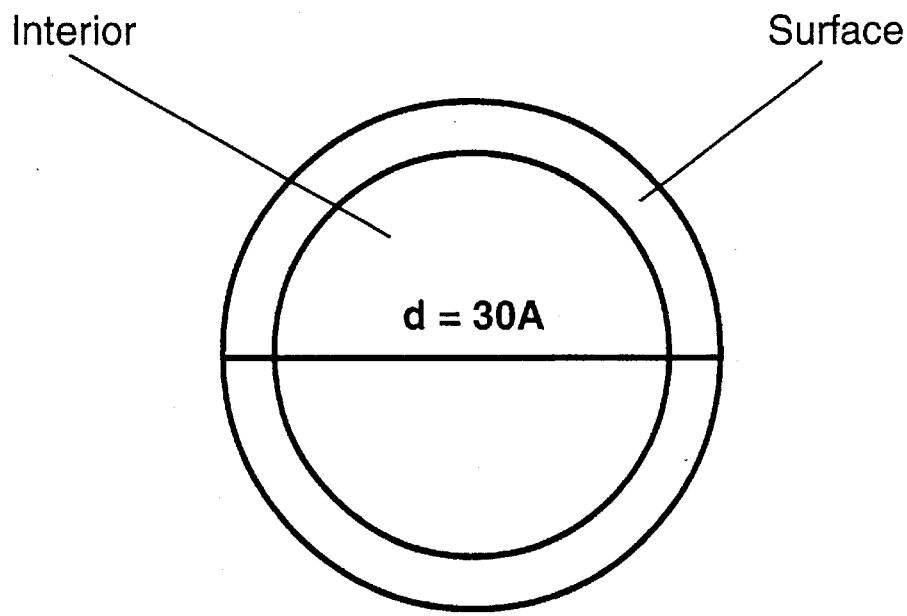

Stated another way, the CUS sites with absorbed water on the ferrihydrite catalyst surface may be viewed as crystal growth sites. In contrast, in the binary ferrihydrite catalysts of the present invention, oxoanions ($MO_x^-$ or $RO_x^-$) are present during precipitation and many of the CUS sites incorporate the oxoanions instead of water thereby forming a chemisorbed oxoanion-iron (M—O—Fe or R—O—Fe) complex at the surface (note FIG. 1). Advantageously, it should be appreciated that the presence of the oxoanion effectively blocks a substantial percentage of the crystal growth cites thereby resulting in a reduction in agglomeration.

As a result of this activity, phase transformation is resisted and an increased surface area of $Fe_{1-x}S$ phase for catalytic activity is formed during DCL reaction. This advantageously results in more efficient and effective direct coal liquefaction, leading to higher yields and lower processing costs.

The following synthesis and examples are presented to further illustrate the invention, but it is not to be considered as limited thereto.

EXAMPLE 1

Preparation of Silicon—Ferrihydrite Catalyst 40.4 grams of an $Fe(NO_3)_3 \cdot 9H_2O$ was added to one liter of distilled water in a two liter glass beaker while being subjected to magnetic stirring. Separately 1.42 grams of $Na_2SiO_3$ was added to 50 mL of distilled water in a smaller beaker. After the $Na_2SiO_3$ was completely dissolved, the solution was poured in the $Fe(NO_3)_3 \cdot 9H_2O$ solution to form an admixed solution with an atomic ratio of Fe/Si or ratio of oxoanion/Fe of 0.05:1. Subsequently, ammonium hydroxide was slowly added to the solution to bring the pH to 9 with constant stirring. Additional ammonium hydroxide was then added drop wise to increase the pH to 10 with constant checking of the pH. During this time the solution was changed from gold to dark reddish brown. The solution was vigorously stirred for another 10 minutes. The precipitate was then filtered and washed repeatedly with distilled water until the filtrate showed a pH of 7. The precipitate cake was then oven dried at 50° C. and ground into a fine powder. Before use, it was vacuumed dried at 130° C. for 3 hours.

EXAMPLE 2

Preparation of Molybdenum—Ferrihydrite Catalyst 40.4 grams of an $Fe(NO_3)_3 \cdot 9H_2O$ was added to one liter of distilled water in a two liter glass beaker while being subjected to magnetic stirring. Separately 6.08 grams of $(NH_4)_6Mo_7O_{24} \cdot 4H_2O$ was added to 50 mL of distilled water in a smaller beaker. After the $(NH_4)_6Mo_7O_{24} \cdot 4H_2O$ was completely dissolved, the solution was poured in the $Fe(NO_3)_3 \cdot 9H_2O$ solution to form an admixed solution with an atomic ratio of Mo/Fe or ratio of oxoanion/Fe of 0.05:1. Subsequently, ammonium hydroxide was slowly added to the solution to bring the pH to 9 with constant stirring. Additional ammonium hydroxide was then added drop wise to increase the pH to 10 with constant checking of the pH. During this time the solution was changed from gold to dark reddish brown. The solution was vigorously stirred for another 10 minutes. The precipitate was then filtered and washed repeatedly with distilled water until the filtrate showed a pH of 7. The precipitate cake was then oven dried at 50° C. and ground into a fine powder. Before use, it was vacuumed dried at 130° C. for 3 hours.

EXAMPLE 3

Preparation of Phosphorous—Ferrihydrite Catalyst 40.4 grams of an $Fe(NO_3)_3 \cdot 9H_2O$ was added to one liter of distilled water in a two liter glass beaker while being subjected to magnetic stirring. Separately 1.72 grams of $Na_2HPO_4$ was added to 50 mL of distilled water in a smaller beaker. After the $Na_2HPO_4$ was completely dissolved, the solution was poured in the $Fe(NO_3)_3 \cdot 9H_2O$ solution to form an admixed solution with an atomic ratio of P/Fe or ratio of oxoanion/Fe of 0.05:1. Subsequently, ammonium hydroxide was slowly added to the solution to bring the pH to 9 with constant stirring. Additional ammonium hydroxide was then added drop wise to increase the pH to 10 with constant checking of the pH. During this time the solution was changed from gold to dark reddish brown. The solution was vigorously stirred for another 10 minutes. The precipitate was then filtered and washed repeatedly with distilled water until the filtrate showed a pH of 7. The precipitate cake was then oven dried at 50° C. and ground into a fine powder. Before use, it was vacuumed dried at 130° C. for 3 hours.

EXAMPLE 4

Preparation of Silicon—Ferrihydrite Catalyst 40.4 grams of an $Fe(NO_3)_3 \cdot 9H_2O$ was added to one liter of distilled water in a two liter glass beaker while being subjected to magnetic stirring. Separately 2.84 grams of $Na_2SiO_3$ was added to 50 mL of distilled water in a smaller beaker. After the $Na_2SiO_3$ was completely dissolved, the solution was poured in the $Fe(NO_3)_3 \cdot 9H_2O$ solution to form an admixed solution with an atomic ratio of Si/Fe or ratio of oxoanion/Fe of 0.1:1. Subsequently, ammonium hydroxide was slowly added to the solution to bring the pH to 9 with constant stirring. Additional ammonium hydroxide was then added drop wise to increase the pH to 10 with constant checking of the pH. During this time the solution was changed from gold to dark reddish brown. The solution was vigorously stirred for another 10 minutes. The precipitate was then filtered and washed repeatedly with distilled water until the filtrate showed a pH of 7. The precipitate cake was then oven dried at 50° C. and ground into a fine powder. Before use, it was vacuumed dried at 130° C. for 3 hours.

EXAMPLE 5

Preparation of Molybdenum—Ferrihydrite Catalyst 40.4 grams of an $Fe(NO_3)_3 \cdot 9H_2O$ is added to one liter of distilled water in a two liter glass beaker while being subject to magnetic stirring. Separately 12.2 grams of $(NH_4)_6Mo_7O_{24} \cdot 4H_2O$ is added to 50 mL of distilled water in a smaller beaker. After the $(NH_4)_6Mo_7O_{24}\cdot 4H_2O$ is completely dissolved, the solution is poured in the $Fe(NO_3)_3\cdot 9H_2O$ solution to form an admixed solution with an atomic ratio of Mo/Fe or ratio of oxoanion/Fe of 0.01:1. Subsequently, ammonium hydroxide is slowly added to the solution to bring the pH to 9 with constant stirring. Additional ammonium hydroxide is then added drop wise to increase the pH to 10 with constant checking of the pH. During this time the solution is changed from gold to dark reddish brown. The solution is vigorously stirred for another 10 minutes. The precipitate is then filtered and washed repeatedly with distilled water until the filtrate showed a pH of 7. The precipitate cake is then oven dried at 50° C. and ground into a fine powder. Before use, it is vacuumed dried at 130° C. for 3 hours.

EXAMPLE 6

Preparation of Phosphorous—Ferrihydrite Catalyst 40.4 grams of an $Fe(NO_3)_3\cdot 9H_2O$ is added to one liter of distilled water in a two liter glass beaker while being subject to magnetic stirring. Separately 3.44 grams of $Na_2HPO_4$ is added to 50 mL of distilled water in a smaller beaker. After the $Na_2HPO_4$ is completely dissolved, the solution is poured in the $Fe(NO_3)_3\cdot 9H_2O$ solution to form an admixed solution with an atomic ratio of P/Fe or ratio of oxoanion/Fe of 0.1:1. Subsequently, ammonium hydroxide is slowly added to the solution to bring the pH to 9 with constant stirring. Additional ammonium hydroxide is then added drop wise to increase the pH to 10 with constant checking of the pH. During this time the solution is changed from gold to dark reddish brown. The solution is vigorously stirred for another 10 minutes. The precipitate is then filtered and washed repeatedly with distilled water until the filtrate showed a pH of 7. The precipitate cake is then oven dried at 50° C. and ground into a fine powder. Before use, it is vacuumed dried at 130° C. for 3 hours.

EXAMPLE 7

Preparation of Boron—Ferrihydrite Catalyst 40.4 grams of an $Fe(NO_3)_3\cdot 9H_2O$ is added to one liter of distilled water in a two liter glass beaker while being subjected to magnetic stirring. Separately 4.58 grams of $NaBO_2\cdot 4H_2O$ is added to 50 mL of distilled water in a smaller beaker. After the $NaBO_2\cdot 4H_2O$ is completely dissolved, the solution is poured in the $Fe(NO_3)_3\cdot 9H_2O$ solution to form an admixed solution with an atomic ratio of B/Fe or ratio of oxoanion/Fe 0.05:1. Subsequently, ammonium hydroxide is slowly added to the solution to bring the pH to 9 with constant stirring. Additional ammonium hydroxide is then added drop wise to increase the pH to 10 with constant checking of the pH. During this time the solution is changed from gold to dark reddish brown. The solution is vigorously stirred for another 10 minutes. The precipitate is then filtered and washed repeatedly with distilled water until the filtrate shows a pH of 7. The precipitate cake is then oven dried at 50° C. and ground into a fine powder. Before use, it is vacuumed dried at 130° C. for 3 hours.

EXAMPLE 8

Preparation of Chromium—Ferrihydrite Catalyst 40.4 grams of an $Fe(NO_3)_3\cdot 9H_2O$ is added to one liter of distilled water in a two liter glass beaker while being subjected to magnetic stirring. Separately 0.63 grams of $(NH_4)_2Cr_2O_7$ is added to 50 mL of distilled water in a smaller beaker. After the $(NH_4)_2Cr_2O_7$ is completely dissolved, the solution is poured in the $Fe(NO_3)_3\cdot 9H_2O$ solution to form an admixed solution with an atomic ratio of Cr/Fe or ratio of oxoanion/Fe of 0.02:1. Subsequently, ammonium hydroxide is slowly added to the solution to bring the pH to 9 with constant stirring. Additional ammonium hydroxide is then added drop wise to increase the pH to 10 with constant checking of the pH. During this time the solution is changed from gold to dark reddish brown. The solution is vigorously stirred for another 10 minutes. The precipitate is then filtered and washed repeatedly with distilled water until the filtrate shows a pH of 7. The precipitate cake is then oven dried at 50° C. and ground into a fine powder. Before use, it is vacuumed dried at 130° C. for 3 hours.

EXAMPLE 9

Preparation of Manganese—Ferrihydrite Catalyst 40.4 grams of an $Fe(NO_3)_3\cdot 9H_2O$ is added to one liter of distilled water in a two liter glass beaker while being subjected to magnetic stirring. Separately 2.98 grams of $(NaMnO_4)\cdot 3H_2O$ is added to 50 mL of distilled water in a smaller beaker. After the $NaMnO_4\cdot 3H_2O$ is completely dissolved, the solution is poured in the $Fe(NO_3)_3\cdot 9H_2O$ solution to form an admixed solution with an atomic ratio of Mn/Fe or ratio of oxoanion/Fe of 0.08:1. Subsequently, ammonium hydroxide is slowly added to the solution to bring the pH to 9 with constant stirring. Additional ammonium hydroxide is then added drop wise to increase the pH to 10 with constant checking of the pH. During this time the solution is changed from gold to dark reddish brown. The solution is vigorously stirred for another 10 minutes. The precipitate is then filtered and washed repeatedly with distilled water until the filtrate shows a pH of 7. The precipitate cake is then oven dried at 50° C. and ground into a fine powder. Before use, it is vacuumed dried at 130° C. for 3 hours.

EXAMPLE 10

27.03 grams of $FeCl_3\cdot 6H_2O$ are substituted for the 40.4 grams of $Fe(NO_3)_3\cdot 9H_2O$ in Examples 1–10.

EXAMPLE 11

28.01 grams of $Fe_2(SO_4)_3\cdot 9H_2O$ are substituted for the 40.4 grams of $Fe(NO_3)_3\cdot 9H_2O$ in Examples 1–10.

EXAMPLE 12

90.03 grams of $Fe(SO_4)_3(NH_4)_2SO_4\cdot 24H_2O$ are substituted for the 40.4 grams of $Fe(NO_3)_3\cdot 9H_2O$ in Examples 1–10.

EXAMPLE 13

Preparation of Citric Acid—Ferrihydrite Catalyst 40.4 gram $Fe(NO_3)_3\cdot 9H_2O$ was added to one liter of distilled water in a two liter glass beaker while undergoing magnetic stirring. Ammonium hydroxide was slowly added to this solution to bring the pH to 10 with constant stirring. During this time the solution was changed from gold to dark reddish brown. The precipitate was filtered and washed repeatedly with distilled water and was subsequently admixed with 50 ml of citric acid solution containing 1–2 grams citric acid. The admix was stirred for 5 minutes and filtered. Finally the precipitate cake was oven dried at 50° C. and ground into a fine powder. Before use it was vacuumed dried at 130° C. for three hours.

EXAMPLES 14–19

Acetic, meso tartaric, L-tartaric, glycolic, salicylic, DL-malic and mucic acids are individually substituted for citric acid in Example 14.

Liquefaction test results for binary ferrihydrite catalysts made from the catalyst precursors treated with Si containing doping agent and citric acid as prepared per Examples 1 and 13 were directly compared with test results for a commercial catalyst of a ferrihydrite structure made from an iron carbonyl with flame synthesis method sold under the trademark NANOCAT and manufactured by Mach I, Inc. of King Of Prussia, Pa. This conventional ferrihydrite catalyst precursor is highly dispersed with a mean particle diameter of 30 Å and a surface area greater than 260 m$^2$/g.

For purposes of these tests, transmission electron micrographs were obtained using a Hitachi H$_{800}$ NASTEM System. The operating voltage was set at 200 kV. Several micrographs from different locations on the grid were taken at magnifications ranging from 50 k to 200 k.

Mössbauer spectra were recorded with a constant acceleration spectrometer. The radioactive source consisted of approximately 50 mCi of $^{57}$Co in Pd matrix. Because of the small particle sizes, the Mössbauer spectra exhibit significant superparamagnetic relaxation effect. In order to observe the magnetic hyperfine splitting, all spectra were recorded at 10K using an Air Products Displex cryogenic system.

X-ray diffraction measurements were performed on a Rigaku Dmax diffractometer using the Cu K$\alpha$ emission line.

DECS-17 Blind Canyon Coal was used for the coal liquefaction experiments. The analysis of the coal sample is listed in Table 1.

TABLE 1

Elemental Analysis of Blind Canyon (DECS-17)

| Proximate, Dry Basis (%) | |
|---|---|
| Ash | 6.57 |
| Volatile | 46.75 |
| Fixed Carbon | 49.85 |
| Ultimate, Dry Ash Free Basis (%) | |
| Carbon | 81.61 |
| Hydrogen | 5.80 |
| Nitrogen | 1.38 |
| Total Sulfur | 0.47 |
| Oxygen | 10.33 |

A mixture of 5 grams of coal and iron catalyst precursor with Fe/coal=0.6% wt was used for each experiment. 1, 2, 3, 4-tetrahydronaphthalene (1, 2, 3, 4-tetrahydronaphthalene/coal=2/1 wt) along with dimethyl disulfide (DMDS) as a sulfur donor for the preparation of the iron catalyst from the precursor (S/precursor=2/1 wt) were also added to the reactor. After loading, the reactor was pressurized with hydrogen to 1000 psig at room temperature and agitated vertically to 400 cycles per minute for an hour in a fluid sand bath of 410° C.

After reaction, the gas was then removed from the cooled reactor and analyzed with gas chromatography. The rest of the products were analyzed using Soxhlet extraction. The definitions of the solubility classes used in this work (on a weight percent, dry-ash-free basis) are as follows (a) oils (pentane soluble), (b) asphaltenes (toluene soluble, pentane insoluble), (c) preasphaltene (THF soluble, toluene insoluble), and (d) insoluble organic matter (IOM). The reproducibility for determination of gas, oils, asphaltenes, preasphaltenes and total conversions are +/−0.2%, +/−2%, +/−2%, +/−1% and +/−2%, respectively.

The micrographs of the binary ferrihydrite catalyst precursors prepared in accordance with example 1 show heavy particle aggregation, although fine nanoscale particles were discerned. Once the particle aggregate was focused on by the electron beam, the particles often spread and individual particles could be easily observed. The spreading force was the static electric Coulomb force induced by sample charging by the high intensity electron beam. The estimated average particle size for the Si-ferrihydrite catalyst precursor was 50 Å. The conventional ferrihydrite catalyst precursor had a particle size of approximately 30 Å and showed much less particle aggregation. This explains why its bulk density is approximately 10 times less than that of the prepared binary ferrihydrite catalyst precursor.

The Mössbauer spectra of the prepared binary and conventional ferrihydrite catalyst precursors indicate that the structures of the catalyst precursors are essentially identical. The x-ray diffraction patterns for all the catalyst precursors show two broad peaks, typical for ferrihydrite. The peak positions for the conventional ferrihydrite and silicon-ferrihydrite catalyst precursors are the same.

In order to examine the phase transformation and agglomeration properties of the catalyst precursors, each of the conventional ferrihydrite as well as the silicon-ferrihydrite sample was subjected to 400° C. annealing for 5 hours in air. X-ray diffraction patterns of the annealed samples were taken. The annealed conventional ferrihydrite catalyst precursor showed only an $\alpha$-Fe$_2$O$_3$ phase. The color of the conventional ferrihydrite sample following annealing turned orange, giving a visual indication of the phase change. Using Scherrer's equation, the average $\alpha$-Fe$_2$O$_3$ particle size was estimated to be greater than 300 Å for the annealed conventional ferrihydrite catalyst precursor.

In contrast the x-ray diffraction patterns and colors for the silicon-ferrihydrite catalyst precursor remain essentially unchanged after annealing with only a trace of $\alpha$-Fe$_2$O$_3$ seen in the silicon-ferrihydrite x-ray diffraction pattern. These results clearly show that the presence of the oxoanion at the surface significantly reduces and/or effectively prevents ferrihydrites from phase transformation to $\alpha$-Fe$_2$O$_3$ and subsequent growth in particle size under annealing conditions.

Coal liquefaction tests were performed on the conventional ferrihydrite and silicon, and citric acid treated binary ferrihydrite catalyst precursors in the presence of a sulfur donor agent in a tubing bomb reactor in accordance with the processing parameters outlined above. Coal conversion was determined based upon the amount of THF-insoluble residual. The coal liquefaction results are presented in Table 2.

TABLE 2

DCL REACTION PRODUCTS ANALYSIS

| Catalyst | Oil | Gas | Asphaltene | Preasphaltene | Total |
|---|---|---|---|---|---|
| Thermal (no catal) | 31.2 | 2.4 | 37.6 | 9.5 | 80.7 |
| Conventional Ferrihydrite | 33.1 | 2.8 | 50.2 | 0.6 | 86.7 |
| $Si_{0.05}$/Ferrihydrite | 35.7 | 3.1 | 42.6 | 5.0 | 86.4 |
| Citric Acid/Ferrihydrite | 36.8 | 2.9 | 42.3 | 2.5 | 84.5 |

The silicon-ferrihydrite and citric acid-ferrihydrite based catalysts showed enhancements in both total yield and oil yield relative to reaction without catalyst and enhancements in oil yield relative to reaction with the conventional ferrihydrite based catalyst.

The invention has been described herein with reference to certain preferred embodiments. However, as obvious variations thereon become apparent to those skilled in the art, the invention is not to be considered as limited thereto.

We claim:

1. A method of preparing a catalyst precursor comprising the steps of:

dissolving an iron salt and a salt of an oxoanion forming agent including an element (M) selected from a group consisting of silicon, molybdenum, phosphorous, boron, chromium, manganese, tungsten and any mixture thereof in water so that a solution of the iron salt and oxoanion forming agent salt has an atomic ratio of M/Fe and a ratio of oxoanion/Fe of between 0.0001 to 0.5;

increasing the pH to 10 by adding a strong base to obtain ferrihydrite precipitate; and collecting precipitate of binary ferrihydrite structure.

2. The method set forth in claim 1, wherein said iron salt is selected from a group consisting of $Fe(NO_3)_3 \cdot 9H_2O$, $Fe(SO_4)_3(NH_4)_2SO_4 \cdot 24H_2O$, $Fe_2(SO_4)_3 \cdot 9H_2O$, $FeCl_3 \cdot 6H_2O$ and any mixtures thereof.

3. The method set forth in claim 2, wherein said salt of the oxoanion forming agent is selected from a group consisting of $Na_2SiO_3 \cdot 9H_2O$, $K_2SiO_3$, $Na_2O \cdot xSiO_2$ (where x=3–5), $K_2Si_4O_9 \cdot H_2O$, $Na_2Si_2O_5$, $K_2Si_2O_5$, $(NH_4)_6Mo_7O_{24} \cdot 4H_2O$, 3$(NH_4)_2 \cdot O.5MoO_3 \cdot 2MoO_4 \cdot 6H_2O$, $Na_2MoO_4 \cdot 2H_2O$, $K_2MoO_4$, $Na_6Mo_7O_{24} \cdot 22H_2O$, $K_2O \cdot 3MoO_4 \cdot 3H_2O$, $Na_2Mo_4O_{13} \cdot 6H_2O$, $K_2O \cdot 3MoO_3 \cdot 3H_2O$, $Na_2HPO_4$, $K_2HPO_4$, $NaH_2PO_4 \cdot 2H_2O$, $Na_2HPO_3 \cdot 5H_2O$, $NaH_2PO_3 \cdot H_2O$, $Na_4P_2O_7 \cdot 10H_2O$, $K_4P_2O_7 \cdot 3H_2O$, $NaNH_4HPO_4 \cdot 4H_2O$, $NaBO_2 \cdot 4H_2O$, $KBO_2$, $NaB_4O_7 \cdot 10H_2O$, $K_2B_4O_7 \cdot 8H_2O$, $Na_2Cr_2O_7 \cdot 2H_2O$, $K_2Cr_2O_7$, $Na_2CrO_4 \cdot 10H_2O$, $K_2CrO_4$, $(NH_4)_2Cr_2O_7$, $Na_2MnO_4 \cdot 10H_2O$, $K_2MnO_4$, $NaMnO_4$, $KMnO_4$, $(NH_4)_6H_2W_{12}O_{40}$ and any mixtures thereof.

4. The method set forth in claim 1, including washing the collected precipitate until a pH of 7 is reached.

5. The method set forth in claim 4, including drying the washed precipitate.

6. The method set forth in claim 1, including adding ammonium hydroxide to the solution to bring the pH to substantially 10 prior to collecting the precipitate.

7. A direct coal liquefaction catalyst precursor comprising a binary ferrihydrite structure of iron (Fe) and an oxoanion forming agent containing a secondary element (M) selected from a group consisting of silicon, molybdenum, phosphorous, boron, chromium, manganese, tungsten and mixtures thereof having an atomic ratio of M/Fe of between 0.0001 to 0.5 that has average particle size of less than 100 Å and further shows no particle agglomeration at temperatures of up to 400° C. in air.

8. The catalyst precursor set forth in claim 7, having a ferrihydrite structure with of oxoanion-iron (M—O—Fe) species chemisorbed at the surface.

9. A catalyst prepared from the binary ferrihydrite precursor of claim 7 by reacting the precursor with a sulfur donor.

10. A method of preparing a catalyst precursor comprising the steps of:

dissolving an iron salt in water to form an iron salt solution;

adjusting the pH of the iron salt solution to between 6 and 10;

collecting a ferrihydrite precipitate;

adding the collected ferrihydrite precipitate to a hydroxycarboxylic acid solution including a hydroxy carboxylic acid selected from a group consisting of citric, meso tartaric, L-tartaric, glycolic, salicylic, DL-malic, mucic acids and any mixtures thereof;

mixing the hydroxy carboxylic acid solution and ferrihydrite precipitate admixture;

filtering the admixture to collect a binary ferrihydrite precipitate product.

11. The method set forth in claim 10, wherein said iron salt is selected from a group consisting of $Fe(NO_3)_3 \cdot 9H_2O$, $Fe(SO_4)_3(NH_4)_2SO_4 \cdot 24H_2O$, $Fe_2(SO_4)_3 \cdot 9H_2O$, $FeCl_3 \cdot 6H_2O$ and any mixtures thereof.

12. The method set forth in claim 10, including adding ammonium hydroxide to the iron salt solution to bring the pH to substantially 10 prior to collecting the ferrihydrite precipitate.

13. The method set forth in claim 10, including washing the collected ferrihydrite precipitate until a pH of 7 is reached.

14. A direct coal liquefaction catalyst precursor comprising a binary ferrihydrite structure of iron chemisorbed with an oxoanion of a hydroxy-carboxylic acid selected from a group consisting of citric, meso tartaric, L-tartaric, glycolic, salicylic, DL-malic music acids and any mixtures thereof that has oxoanion-iron ratio of 0.0001 to 0.5, an average particle size of less than 100 Å.

15. A catalyst prepared from the catalyst precursor of claim 14 by reacting the precursor with a sulfur donor.

16. A method of preparing a catalyst precursor comprising the steps of:

preparing a binary ferrihydrite product by chemisorbing oxoanions with iron so as to provide an oxoanion-iron ratio of between 0.0001 to 0.5, said oxoanions being selected from a group consisting of $MO_x^-$ and $RO_x^-$ wherein M equals silicon, molybdenum, phosphorous, boron, chromium, manganese, tungsten and mixtures thereof and $RO_x^-$ equal an anion of citric acid, acetic acid, meso tartaric acid, L-tartaric acid, glycolic acid, salicylic acid, DL-malic acid, mucic acid and mixtures thereof.

* * * * *